(12) United States Patent
Wang et al.

(10) Patent No.: US 11,467,298 B2
(45) Date of Patent: Oct. 11, 2022

(54) VECTOR DENOISING METHOD AND DEVICE FOR MULTICOMPONENT SEISMIC DATA

(71) Applicant: INSTITUTE OF GEOCHEMISTRY, CHINESE ACADEMY OF SCIENCES, Guiyang (CN)

(72) Inventors: Chao Wang, Guiyang (CN); Yun Wang, Guiyang (CN)

(73) Assignee: INSTITUTE OF GEOCHEMISTRY, CHINESE ACADEMY OF SCIENCES, Guiyang (CN)

( * ) Notice: Subject to any disclaimer, the term of this patent is extended or adjusted under 35 U.S.C. 154(b) by 20 days.

(21) Appl. No.: 17/025,884

(22) Filed: Sep. 18, 2020

(65) Prior Publication Data

US 2021/0003726 A1    Jan. 7, 2021

Related U.S. Application Data

(63) Continuation of application No. PCT/CN2018/115413, filed on Nov. 14, 2018.

(30) Foreign Application Priority Data

Aug. 29, 2018 (CN) .......................... 201810998807.7

(51) Int. Cl.
G01V 1/28  (2006.01)

(52) U.S. Cl.
CPC .......... *G01V 1/28* (2013.01); *G01V 2210/324* (2013.01)

(58) Field of Classification Search
None
See application file for complete search history.

(56) References Cited

U.S. PATENT DOCUMENTS 8,995,223 B2    3/2015  Berteussen et al.
9,360,577 B2 *  6/2016  Nagarajappa .......... G01V 1/364
(Continued)

FOREIGN PATENT DOCUMENTS

CN    102096824 A       6/2011
CN    102854533 A  *    1/2013
(Continued)

OTHER PUBLICATIONS

International Search Report (Year: 2019).*
(Continued)

*Primary Examiner* — Lina M Cordero
(74) *Attorney, Agent, or Firm* — Westbridge IP LLC

(57) ABSTRACT

The present application provides a vector denoising method and a vector denoising device for multicomponent seismic data, which relate to the field of seismic data processing technologies. The vector denoising method for multicomponent seismic data includes: decomposing multicomponent seismic gather data to obtain a plurality of small multicomponent seismic data; obtaining quaternary frequency domain seismic data by performing a quaternary Fourier transformation according to each of the plurality of small multicomponent seismic data; extracting frequency slices from the quaternary frequency domain seismic data in a quaternary frequency domain, and filtering the frequency slices by using a Cadzow filtering method to obtain filtered quaternary frequency domain seismic data; and performing an inverse quaternary Fourier transformation on the filtered quaternary frequency domain seismic data to obtain filtered seismic data of each component.

16 Claims, 11 Drawing Sheets

(56) References Cited

U.S. PATENT DOCUMENTS

| | | | |
|---|---|---|---|
| 10,338,254 B2* | 7/2019 | Deschizeaux | G01V 1/364 |
| 2012/0191417 A1* | 7/2012 | Taylor | G01R 33/4625 |
| | | | 702/189 |

FOREIGN PATENT DOCUMENTS

| | | |
|---|---|---|
| CN | 102854533 A | 1/2013 |
| CN | 104360393 A | 2/2015 |
| CN | 104616323 A | 5/2015 |
| CN | 105700014 A | 6/2016 |
| CN | 106646612 A | 5/2017 |

OTHER PUBLICATIONS

Bai, Multi-wave Joint Attributes Extraction and Hydrocarbon Prediction, Fundamental Science, China Master's Theses Full-Text Database, Apr. 15, 2011, China.
First Office Action in counterpart Chinese Application No. 201810998807.7, dated May 13, 2019.
International Search Report in corresponding PCT Application No. PCT/CN2018/115413, dated May 29, 2019.
Second Office Action in counterpart Chinese Application No. 201810998807.7, dated Sep. 23, 2019.
Written Opinion in corresponding PCT Application No. PCT/CN2018/115413, dated May 29, 2019.

* cited by examiner

Dividing the multicomponent seismic gather data into the plurality of small multicomponent seismic data with a time length of T and a horizontal trace number of N — S201

Performing a quaternion transformation on the small multicomponent seismic data to obtain transformed small multicomponent seismic data $q(t, x) = a(t, x) + b(t, x)i + c(t, x)j + d(t, x)k$ — S202

Performing the quaternary Fourier transformation on the transformed small multicomponent seismic data to obtain the quaternary frequency domain seismic data — S203

FIG. 3

Extracting the frequency slices of from the quaternary frequency domain seismic data in the quaternary frequency domain, and constructing a quaternion Hankel matrix by using the frequency slices — S301

Decomposing the quaternion Hankel matrix by using a singular value decomposition method — S302

Retaining k largest singular values and setting other singular values to zero, the quaternion Hankel matrix being reconstructed to obtain a reduced rank matrix — S303

Averaging the reduced rank matrix along an anti-diagonal line to obtain the filtered quaternary frequency domain seismic data — S304

FIG. 4

VECTOR DENOISING METHOD AND DEVICE FOR MULTICOMPONENT SEISMIC DATA

CROSS-REFERENCE TO RELATED APPLICATIONS

The present application is a continuation application of International Application No. PCT/CN2018/115413 filed on Nov. 14, 2018, which claims priority to Chinese patent application No. 201810998807.7 filed on Aug. 29, 2018. Both applications are incorporated herein by reference in their entireties.

TECHNICAL FIELD

The present application relates to the field of seismic data processing technologies, in particular to a vector denoising method and a vector denoising device for multicomponent seismic data.

BACKGROUND

Multicomponent seismic data simultaneously records movement of a particle in a vertical direction and two horizontal directions, which is a complete record of a seismic wave vector field. Vector data not only provides travel time information (velocity), amplitude information and frequency information of a longitudinal wave and a transverse wave at the same time, but also provides a relative amplitude relationship between components for a same wave, and information such as amplitude difference of different waves, travel time difference of different waves, etc. Unique information of these vector wave fields can describe a structure, lithology, fluid saturation, pore pressure, fracture and other features of an underground medium in more detail and accurately. However, due to the complexity of acquisition environment, exploration targets and surface conditions, a signal-to-noise ratio of an acquired multicomponent seismic data is usually very low. A prerequisite for making full use of vector wave field information is to perform a denoising processing retaining amplitude and vector features on the multicomponent seismic data.

In the prior art, there are methods such as f-x(y) domain prediction filtering, f-x(y) domain Cadzow filtering, median filtering, SVD singular value decomposition, and F-K denoising, S transform denoising and wavelet transform denoising based on a mathematical transformation, etc. These filtering methods have achieved good denoising effects in conventional longitudinal wave data processing. However, in the prior art, when the multicomponent seismic data is processed, each component is treated as a scalar field separately to be processed, which is easy to destroy vector features of the multicomponent seismic wave field. Moreover, due to the complexity of multicomponent seismic noise, when some methods that have good denoising effects on longitudinal wave data are used to denoise transverse wave data, denoising effects of which are not ideal.

SUMMARY

One of the purposes of the present application is to provide a vector denoising method and a vector denoising device for multicomponent seismic data in view of the above-mentioned deficiencies in the prior art, so as to solve at least the problem that the traditional filtering method may damage vector features of the multicomponent seismic data and cannot effectively protect a seismic data signal, while removing noise of the multicomponent seismic data.

In order to achieve the foregoing purposes, the technical solutions adopted in embodiments of the present application are as follows.

In a first aspect, an embodiment of the present application provides a vector denoising method for multicomponent seismic data, including: decomposing multicomponent seismic gather data to obtain a plurality of small multicomponent seismic data; obtaining quaternary frequency domain seismic data by performing a quaternary Fourier transformation according to each of the plurality of small multicomponent seismic data; extracting frequency slices from the quaternary frequency domain seismic data in a quaternary frequency domain, and filtering the frequency slices by using a Cadzow filtering method to obtain filtered quaternary frequency domain seismic data; and performing an inverse quaternary Fourier transformation on the filtered quaternary frequency domain seismic data to obtain filtered seismic data of each component.

Optionally, the decomposing multicomponent seismic gather data to obtain a plurality of small multicomponent seismic data includes: dividing the multicomponent seismic gather data into the plurality of small multicomponent seismic data with a time length of T and a horizontal trace number of N. There is data overlap between any two adjacent small multicomponent seismic data of the plurality of small multicomponent seismic data, the N is an integer greater than 0 and less than total trace number of seismic gather data, and the T is an integer greater than 0 and less than a total number of time sampling points of the seismic gather data.

Optionally, the obtaining quaternary frequency domain seismic data by performing a quaternary Fourier transformation according to each of the plurality of small multicomponent seismic data includes: performing a quaternion transformation on the small multicomponent seismic data to obtain transformed small multicomponent seismic data $q(t, x)$, $q(t, x)=a(t, x)+b(t, x) i+c(t, x) j+d(t, x) k$, the x is an ordinal number of seismic traces, the x is equal to 1, 2, . . . , N, the t is an ordinal number of time sampling points, the t is equal to 1, 2, . . . , T, the i, j and k are imaginary units of quaternion, the $a(t, x)$ is pressure component seismic data, the $b(t, x)$ is x-component seismic data, the $c(t, x)$ is y-component seismic data, the $d(t, x)$ is z-component seismic data, and when any one of the pressure component seismic data, the x-component seismic data, the y-component seismic data and the z-component seismic data is missing, missing component seismic data is replaced with zero; and performing the quaternary Fourier transformation on the transformed small multicomponent seismic data to obtain the quaternary frequency domain seismic data.

Optionally, the extracting frequency slices from the quaternary frequency domain seismic data in a quaternary frequency domain, and filtering the frequency slices by using a Cadzow filtering method to obtain filtered quaternary frequency domain seismic data includes: extracting the frequency slices of $Q_1, Q_2, \ldots Q_N$ from the quaternary frequency domain seismic data in the quaternary frequency domain, the $Q_{i=1, 2, \ldots N}$ representing a value of an i-th trace at a given frequency in the quaternary frequency domain, and constructing a quaternion Hankel matrix by using the frequency slices, the quaternion Hankel matrix being:

$$A = \begin{bmatrix} Q_1 & Q_2 & \cdots & Q_{N-M+1} \\ Q_2 & Q_3 & \cdots & Q_{N-M+2} \\ \vdots & \vdots & \ddots & \vdots \\ Q_M & Q_{M+1} & \cdots & Q_N \end{bmatrix}$$

and the M being a positive integer less than N; decomposing the quaternion Hankel matrix by using a singular value decomposition method; retaining k largest singular values and setting other singular values to zero, the quaternion Hankel matrix being reconstructed to obtain a reduced rank matrix $F_k(A)$; and averaging the reduced rank matrix $F_k(A)$ along an anti-diagonal line to obtain the filtered quaternary frequency domain seismic data.

Optionally, in the quaternion Hankel matrix, the M is an integer obtained by rounding up N/2.

Optionally, the performing an inverse quaternary Fourier transformation on the filtered quaternary frequency domain seismic data to obtain filtered seismic data of each component includes: performing the inverse quaternary Fourier transformation on the filtered quaternary frequency domain seismic data obtained after filtering all frequency slices to obtain the filtered seismic data of each component.

Optionally, the performing the inverse quaternary Fourier transformation on the filtered quaternary frequency domain seismic data includes: performing the inverse quaternary Fourier transformation on the filtered quaternary frequency domain seismic data $Q'(f,x)$ to obtain the filtered seismic data $q'(t,x)$ of each component, wherein $q'(t,x)=\int_{-\infty}^{+\infty} e^{-2\pi\mu ft} Q'(f,x) df$.

In a second aspect, an embodiment of the present application provides a vector denoising device for multicomponent seismic data, including: a calculating module, configured to decompose multicomponent seismic gather data to obtain a plurality of small multicomponent seismic data, and obtaining quaternary frequency domain seismic data by performing a quaternary Fourier transformation according to each of the plurality of small multicomponent seismic data; a filtering module, configured to extract frequency slices from the quaternary frequency domain seismic data in a quaternary frequency domain, and filter the frequency slices by using a Cadzow filtering method to obtain filtered quaternary frequency domain seismic data; and a determining module, configured to perform an inverse quaternary Fourier transformation on the filtered quaternary frequency domain seismic data to obtain filtered seismic data of each component.

Optionally, the calculating module is specifically configured to divide the multicomponent seismic gather data into the plurality of small multicomponent seismic data with a time length of T and a horizontal trace number of N, wherein there is data overlap between any two adjacent small multicomponent seismic data of the plurality of small multicomponent seismic data, the N is an integer greater than 0 and less than total trace number of seismic gather data, and the T is an integer greater than 0 and less than a total number of time sampling points of the seismic gather data.

Optionally, the calculating module is configured to: perform a quaternion transformation on the small multicomponent seismic data to obtain transformed small multicomponent seismic data $q(t, x)$, wherein $q(t, x)=a(t, x)+b(t, x) i+c(t, x) j+d(t, x) k$, the x is an ordinal number of seismic traces, the x is equal to 1, 2, ..., N, the t is an ordinal number of time sampling points, the t is equal to 1, 2, ..., T, the i, j and k are imaginary units of quaternion, the $a(t, x)$ is pressure component seismic data, the $b(t, x)$ is x-component seismic data, the $c(t, x)$ is y-component seismic data, the $d(t, x)$ is z-component seismic data, and when any one of the pressure component seismic data, the x-component seismic data, the y-component seismic data and the z-component seismic data is missing, missing component seismic data is replaced with zero; and perform the quaternary Fourier transformation on the transformed small multicomponent seismic data to obtain the quaternary frequency domain seismic data.

Optionally, the filtering module is specifically configured to: extract the frequency slices of $Q_1, Q_2, \ldots Q_N$ from the quaternary frequency domain seismic data in the quaternary frequency domain, the $Q_{i=1, 2, \ldots, N}$ representing a value of an i-th trace at a given frequency in the quaternary frequency domain, and construct a quaternion Hankel matrix by using the frequency slices, the quaternion Hankel matrix being:

$$A = \begin{bmatrix} Q_1 & Q_2 & \cdots & Q_{N-M+1} \\ Q_2 & Q_3 & \cdots & Q_{N-M+2} \\ \vdots & \vdots & \ddots & \vdots \\ Q_M & Q_{M+1} & \cdots & Q_N \end{bmatrix}$$

and the M being a positive integer less than N; decompose the quaternion Hankel matrix by using a singular value decomposition method; retain k largest singular values and set other singular values to zero, the quaternion Hankel matrix being reconstructed to obtain a reduced rank matrix $F_k(A)$; and average the reduced rank matrix $F_k(A)$ along an anti-diagonal line to obtain the filtered quaternary frequency domain seismic data.

Optionally, in the quaternion Hankel matrix, the M is an integer obtained by rounding up N/2.

Optionally, the determining module is specifically configured to perform the inverse quaternary Fourier transformation on the filtered quaternary frequency domain seismic data obtained after filtering all frequency slices to obtain the filtered seismic data of each component.

Optionally, the determining module is configured to perform the inverse quaternary Fourier transformation on the filtered quaternary frequency domain seismic data $Q'(f,x)$ to obtain the filtered seismic data $q'(t, x)$ of each component, wherein $q'(t,x)=\int_{-\infty}^{+\infty} e^{-2\pi\mu ft} Q'(f,x) df$.

In a third aspect, an embodiment of the present application provides a machine readable storage medium on which a machine executable instruction is stored. When the machine executable instruction is executed by one or more processors, the vector denoising method for multicomponent seismic data provided in any above embodiments is implemented.

The beneficial effects of the embodiments of the present application include at least the followings.

By combining a quaternary Fourier transformation and a Cadzow filtering method, multicomponent seismic data is filtered in a vector space, which can effectively suppress noise and better retain and restore vector features of an original multicomponent seismic signal.

BRIEF DESCRIPTION OF DRAWINGS

In order to more clearly describe the technical solutions of the embodiments of the present application, the following may briefly introduce the drawings that need to be used in the embodiments. It should be understood that the following drawings only show certain embodiments of the present application, and therefore should not be regarded as a limitation of scope. For those of ordinary skill in the art, other related drawings may be obtained based on these drawings without creative work.

FIG. 3 is a second schematic flowchart illustrating a vector denoising method for multicomponent seismic data according to an embodiment of the present application.

FIG. 4 is a third schematic flowchart illustrating a vector denoising method for multicomponent seismic data according to an embodiment of the present application.

DETAILED DESCRIPTION OF THE EMBODIMENTS

In order to make the purposes, technical solutions and advantages of the embodiments of the present application clearer, the technical solutions in the embodiments of the present application are clearly and completely described in the following with reference to the accompanying drawings in the embodiments of the present application. Obviously, the described embodiments are a part of the embodiments of the present application, and not all of the embodiments.

Figure 1:
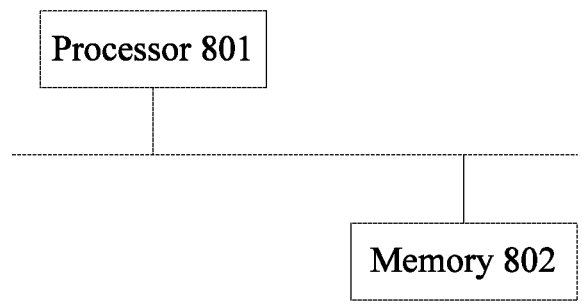
FIG. 1 is a schematic structural diagram illustrating a data processing device according to an embodiment of the present application.

Referring to FIG. 1, FIG. 1 is a schematic structural diagram illustrating a data processing device according to an embodiment of the present application. As shown in FIG. 1, the data processing device may include a processor 801 and a memory 802. The memory 802 is configured to store a machine executable program, and the processor 801 executes or calls the program stored in the memory 802, thereby realizing vector denoising for multicomponent seismic data. In this embodiment, the data processing device may be a personal computer, a server, or any electronic device that may perform data processing.

Figure 2:
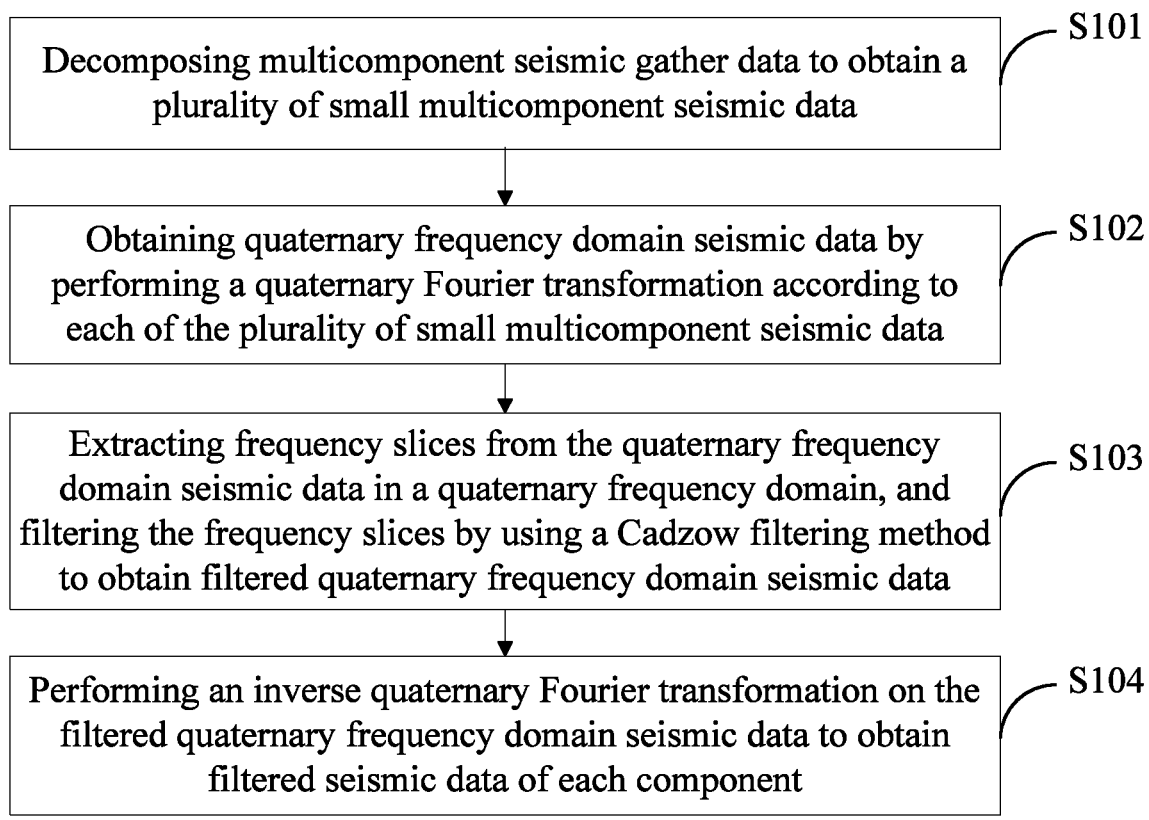
FIG. 2 is a first schematic flowchart illustrating a vector denoising method for multicomponent seismic data according to an embodiment of the present application.

Referring to FIG. 2, FIG. 2 is a first schematic flowchart illustrating a vector denoising method for multicomponent seismic data applied to the data processing device shown in FIG. 1. As shown in FIG. 2, the vector denoising method for multicomponent seismic data includes the following content.

S101: decomposing multicomponent seismic gather data to obtain a plurality of small multicomponent seismic data.

Specifically, before decomposing the multicomponent seismic gather data, the multicomponent seismic gather data needs to be collected first. In this embodiment, pre-stored two-dimensional multicomponent seismic gather data may be read by the processor 801. Or, the processor 801 may receive the two-dimensional multicomponent seismic gather data from another device through a communication unit (not shown). Gather is a collection of multiple seismic traces, and each seismic trace is a reception record of a geophone.

S102: obtaining quaternary frequency domain seismic data by performing a quaternary Fourier transformation according to each of the plurality of small multicomponent seismic data.

In this embodiment, the processor 801 performs the quaternary Fourier transformation on the small multicomponent seismic data along a time direction to convert a time domain signal to a frequency domain signal, which is more conducive to signal analysis and convenient for an analysis and processing of seismic data.

S103: extracting frequency slices from the quaternary frequency domain seismic data in a quaternary frequency domain, and filtering the frequency slices by using a Cadzow filtering method to obtain filtered quaternary frequency domain seismic data. The frequency slices are quaternary frequency domain seismic data under a certain sampling frequency.

Specifically, in this embodiment, the processor 801 uses the Cadzow filtering method to filter the frequency slices corresponding to each small multicomponent seismic data, so as to obtain complete filtered quaternary frequency domain seismic data. Filtering the multicomponent seismic data may effectively remove noise information in the multicomponent seismic data, while better retaining vector feature effects.

It should be noted that the multicomponent seismic data simultaneously records movement of a particle in a vertical direction and two horizontal directions, which is a complete record of a seismic wave vector field. Vector data not only provides travel time information (velocity), amplitude information and frequency information of a longitudinal wave and a transverse wave at the same time, but also provides a relative amplitude relationship between components for a same wave, and information such as amplitude difference of different waves, travel time difference of different waves, etc. Unique information of these vector wave fields can describe a structure, lithology, fluid saturation, pore pressure, fractures and other features of an underground medium in more detail and accurately.

S104: performing an inverse quaternary Fourier transformation on the filtered quaternary frequency domain seismic data to obtain filtered seismic data of each component.

Specifically, the processor 801 may perform an inverse quaternary Fourier transformation on the filtered quaternary frequency domain seismic data to obtain filtered seismic data of each component.

FIG. 3 is a second schematic flowchart illustrating a vector denoising method for multicomponent seismic data according to an embodiment of the present application. As shown in FIG. 3, in the step S101, the decomposing multicomponent seismic gather data to obtain a plurality of small multicomponent seismic data includes the following content.

S201: dividing the multicomponent seismic gather data into the plurality of small multicomponent seismic data with a time length of T and a horizontal trace number of N, wherein, there is data overlap between any two adjacent small multicomponent seismic data of the plurality of small multicomponent seismic data, the N is an integer greater than 0 and less than total trace number of seismic gather data, T is measured by a number of sampling points, and the T is an integer greater than 0 and less than a total number of time sampling points of the seismic gather data.

It should be noted that there is the data overlap between any two adjacent small multicomponent seismic data of the plurality of small multicomponent seismic data divided by the processor 801, so as to avoid boundary effects.

Specifically, in an achievable way, the multicomponent seismic data is assumed to be (1, 2, 3, 4, 5, 6), which is decomposed into the plurality of small multicomponent seismic data. An overlap mode between the plurality of small multicomponent seismic data may be: (1, 2, 3), (2, 3, 4), (3, 4, 5), (4, 5, 6).

Further, the obtaining quaternary frequency domain seismic data by performing a quaternary Fourier transformation according to each of the plurality of small multicomponent seismic data, which is executed by the processor 801, includes the following content.

S202: performing a quaternion transformation on the small multicomponent seismic data to obtain transformed small multicomponent seismic data q(t, x).

$$q(t,x)=a(t,x)+b(t,x)i+c(t,x)j+d(t,x)k.$$

The x is an ordinal number of seismic traces, and the x is equal to 1, 2, . . . , N. The t is an ordinal number of time sampling points, and the t is equal to 1, 2, . . . , T. The i, j and k are imaginary units of quaternion. The a(t, x) is pressure component seismic data, the b(t, x) is x-component seismic data, the c(t, x) is y-component seismic data, and the d(t, x) is z-component seismic data. When any one of the pressure component seismic data, the x-component seismic data, the y-component seismic data and the z-component seismic data is missing, missing component seismic data is replaced with zero.

The ordinal number x of seismic traces and the ordinal number t of time sampling points are both integers greater than zero.

It should be noted that a quaternion theory provides a powerful tool for vector signal processing. One quaternion contains one real part and three imaginary parts, and therefore, it is very suitable for expressing three-component or four-component seismic data. By performing the quaternion transformation on the small multicomponent seismic data, original scalar data may be effectively expressed by vectors.

Specifically, the i, j and k are the imaginary units of the quaternion, and the multiplication law satisfied by the three imaginary units is as follows:

$$ii=jj=kk=-1$$

$$ij=-ji=k$$

$$jk=-kj=i$$

$$ki=-ik=j$$

Therefore, the multiplication of the quaternion does not satisfy the commutative law.

S203: performing the quaternary Fourier transformation on the transformed small multicomponent seismic data to obtain the quaternary frequency domain seismic data.

It should be noted that, in this embodiment, the processor 801 performs the quaternary Fourier transformation along the time direction on the plurality of small multicomponent seismic data represented by the quaternion, so as to transform the multicomponent seismic data from time domain to frequency domain for analysis and processing.

Specifically, the quaternary Fourier transformation has multiple definition forms. For example, there are three quaternion Fourier transformation forms of left, right and bilateral, which are defined by a multiplication non-commutative property of the quaternion. Since the quaternion has three imaginary units, a transformation axis of the quaternary Fourier transformation may be selected in any direction in a three-dimensional space. A quaternary Fourier transformation with a single transformation axis or double transformation axes may also be defined. The generalized Fourier transformation formula has a wide range of uses, which is defined as:

$$Q(f,x)=\int_{-\infty}^{+\infty} e^{2\pi \mu f t} q(t,x) dt$$

The f is the frequency, and the μ is the transformation axis, which may be any unit pure quaternion. The common transformation axis μ is selected as $$\frac{i+j+k}{\sqrt{3}}.$$

Optionally, referring to FIG. 4, which is a third schematic flowchart illustrating a vector denoising method for multicomponent seismic data according to an embodiment of the present application. As shown in FIG. 4, the extracting frequency slices from the quaternary frequency domain seismic data in a quaternary frequency domain and filtering the frequency slices by using a Cadzow filtering method to obtain filtered quaternary frequency domain seismic data, which is executed by the processor 801, may include the following content.

S301: extracting the frequency slices of $Q_1, Q_2, \ldots Q_N$ from the quaternary frequency domain seismic data in the quaternary frequency domain, the $Q_{i=1, 2, \ldots, N}$ representing a value of an i-th trace at a given frequency in the quaternary frequency domain, and constructing a quaternion Hankel matrix by using the frequency slices.

The quaternion Hankel matrix is defined as:

$$A = \begin{bmatrix} Q_1 & Q_2 & \cdots & Q_{N-M+1} \\ Q_2 & Q_3 & \cdots & Q_{N-M+2} \\ \vdots & \vdots & \ddots & \vdots \\ Q_M & Q_{M+1} & \cdots & Q_N \end{bmatrix}$$

The M is a positive integer less than N.

It should be noted that the above is in the frequency domain, and the processor 801 may extract the frequency slices from each small multicomponent seismic data after the quaternary Fourier transformation, according to a corresponding frequency.

Specifically, in the Hankel matrix mentioned above, the M is a positive integer. In order to make the matrix as close to a square matrix as possible, usually, the M is an integer obtained by rounding up N/2, i.e., M=⌈N/2⌉, and the symbol ⌈ ⌉ represents rounding up.

S302: decomposing the quaternion Hankel matrix by using a singular value decomposition method.

Specifically, the processor 801 may perform SVD singular value decomposition on the Hankel matrix A to obtain $USV^H$. The superscript H represents conjugate transpose, and columns of the U and V are a left singular vector and a right singular vector respectively. The S is a real diagonal matrix, and diagonal elements are singular values.

S303: retaining k largest singular values and setting other singular values to zero, the quaternion Hankel matrix being reconstructed to obtain a reduced rank matrix $F_k(A)$.

In the step S303, the processor 801 retains the k largest singular values, sets the other singular values to zero, so as to obtain a new diagonal matrix S'. The processor 801 reconstructs the quaternion Hankel matrix to obtain the reduced rank matrix $F_k$ (A)=US'$V^H$, by using the new diagonal matrix S', the left singular vector matrix U and the right singular vector matrix V. The k is often taken as the number of events contained in the small seismic data.

S304: averaging the reduced rank matrix $F_k$ (A) along an anti-diagonal line to obtain the filtered quaternary frequency domain seismic data.

Optionally, the performing an inverse quaternary Fourier transformation on the filtered quaternary frequency domain seismic data to obtain filtered seismic data of each component, which is executed by the processor 801, may include:

performing the inverse quaternary Fourier transformation on the filtered quaternary frequency domain seismic data obtained after filtering all frequency slices to obtain the filtered seismic data of each component.

Specifically, after all frequency slices are filtered, the filtered quaternary frequency domain seismic data Q'(f,x) is obtained, and the processor 801 performs the inverse quaternary Fourier transformation on the filtered quaternary frequency domain seismic data Q'(f,x) to obtain the filtered seismic data q'(t,x) of each component, which is specifically calculated based on an inverse quaternary Fourier transformation formula, and the formula is as follows:

$$q'(t,x) = \int_{-\infty}^{+\infty} e^{-2\pi \mu f t} Q'(f,x) df$$

Figure 5A:
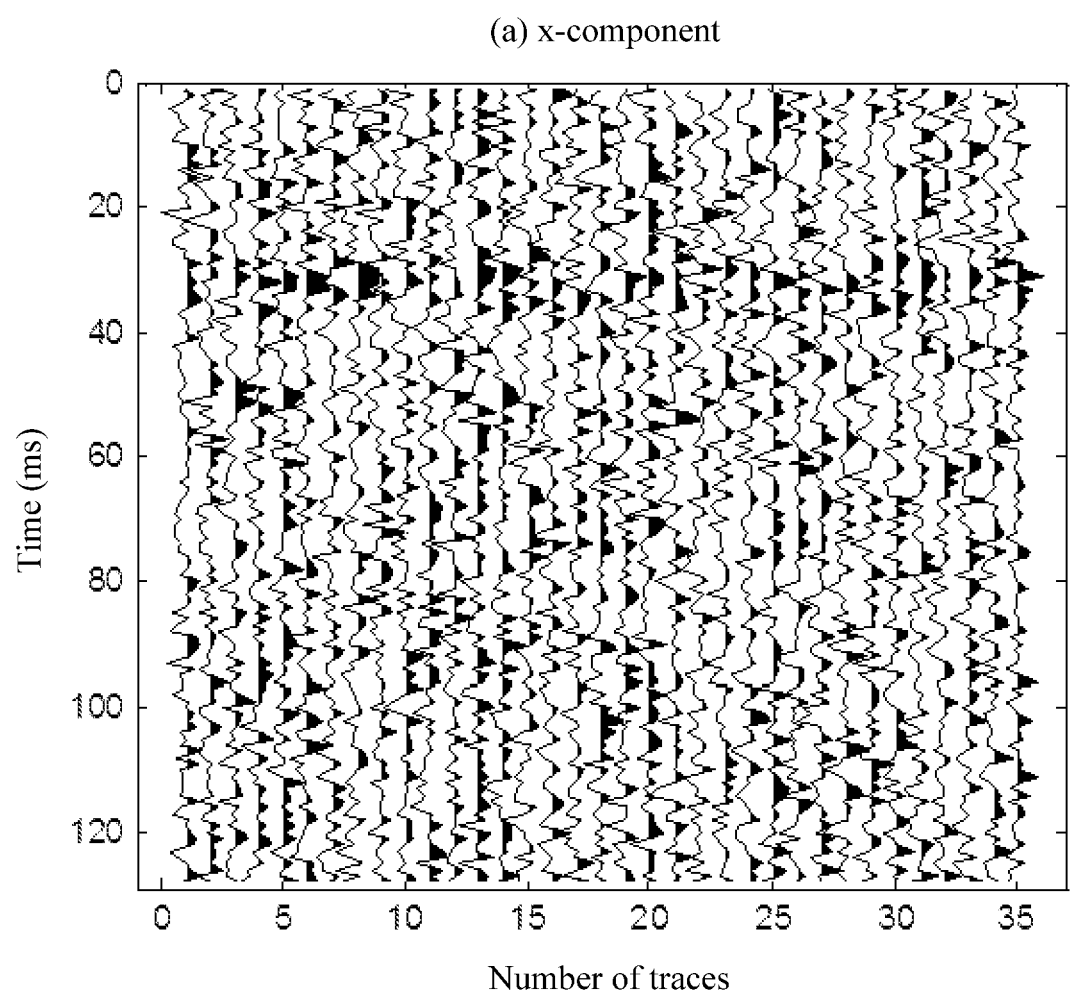
FIG. 5A, FIG. 5B and FIG. 5C are effect diagrams illustrating x-component, y-component and z-component of synthetic seismic data after adding random noise according to an embodiment of the present application.
Figure 5B:
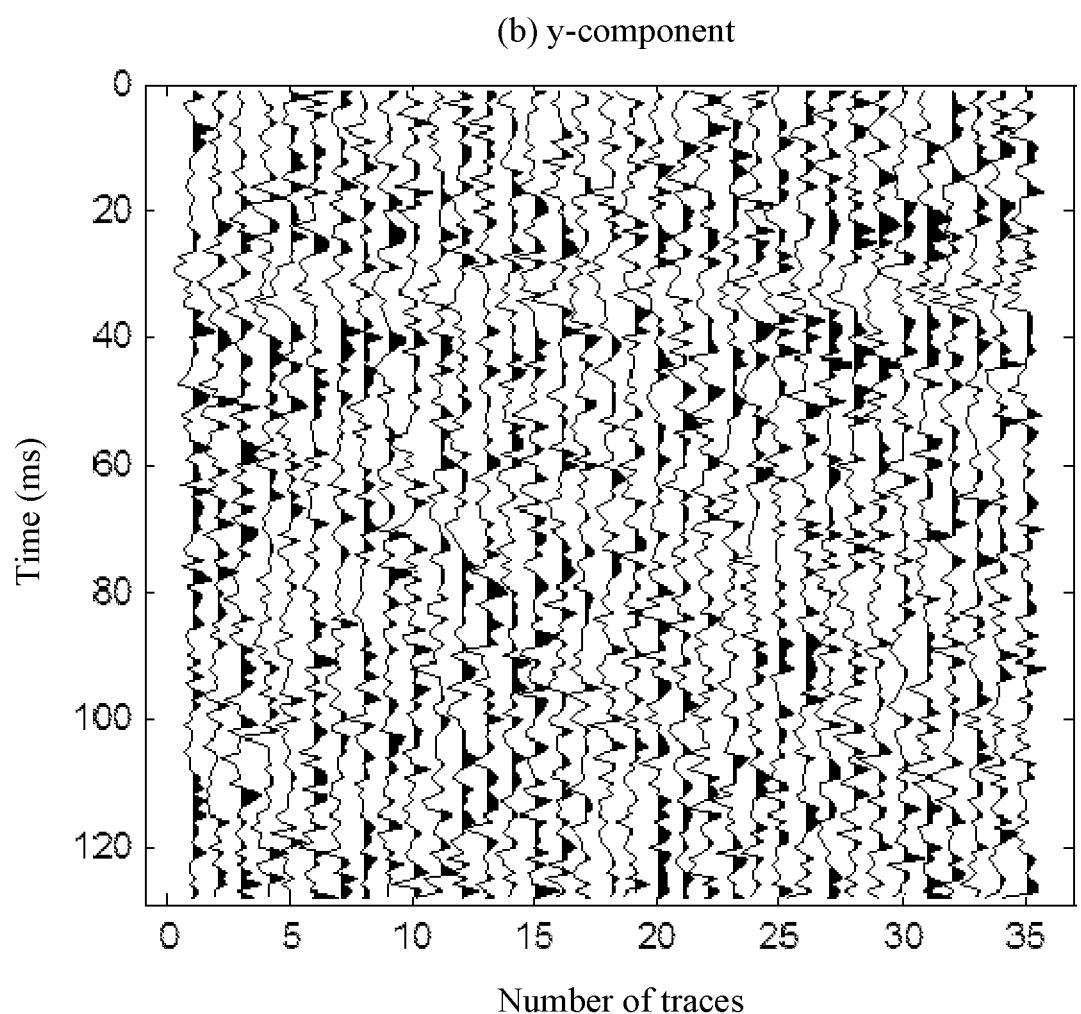
Figure 5C:
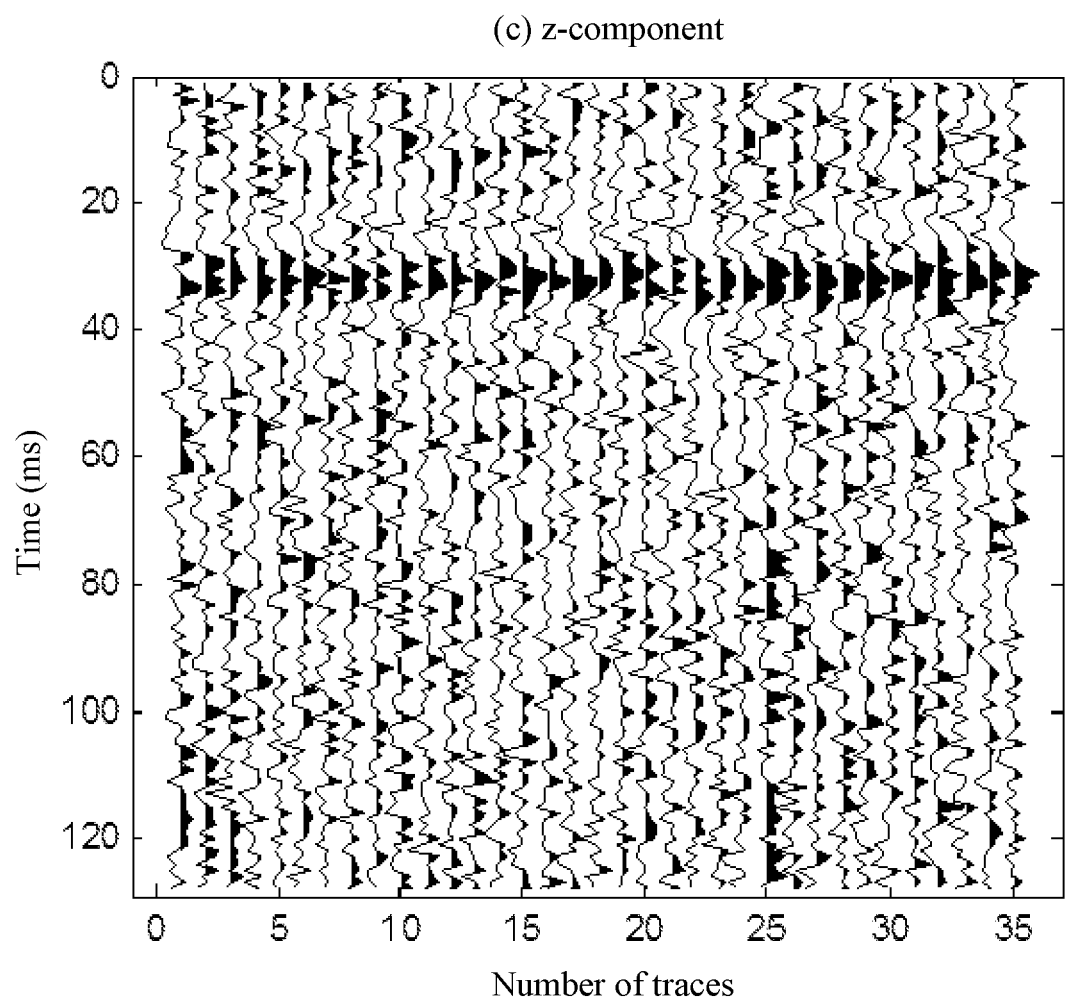
Figure 6A:
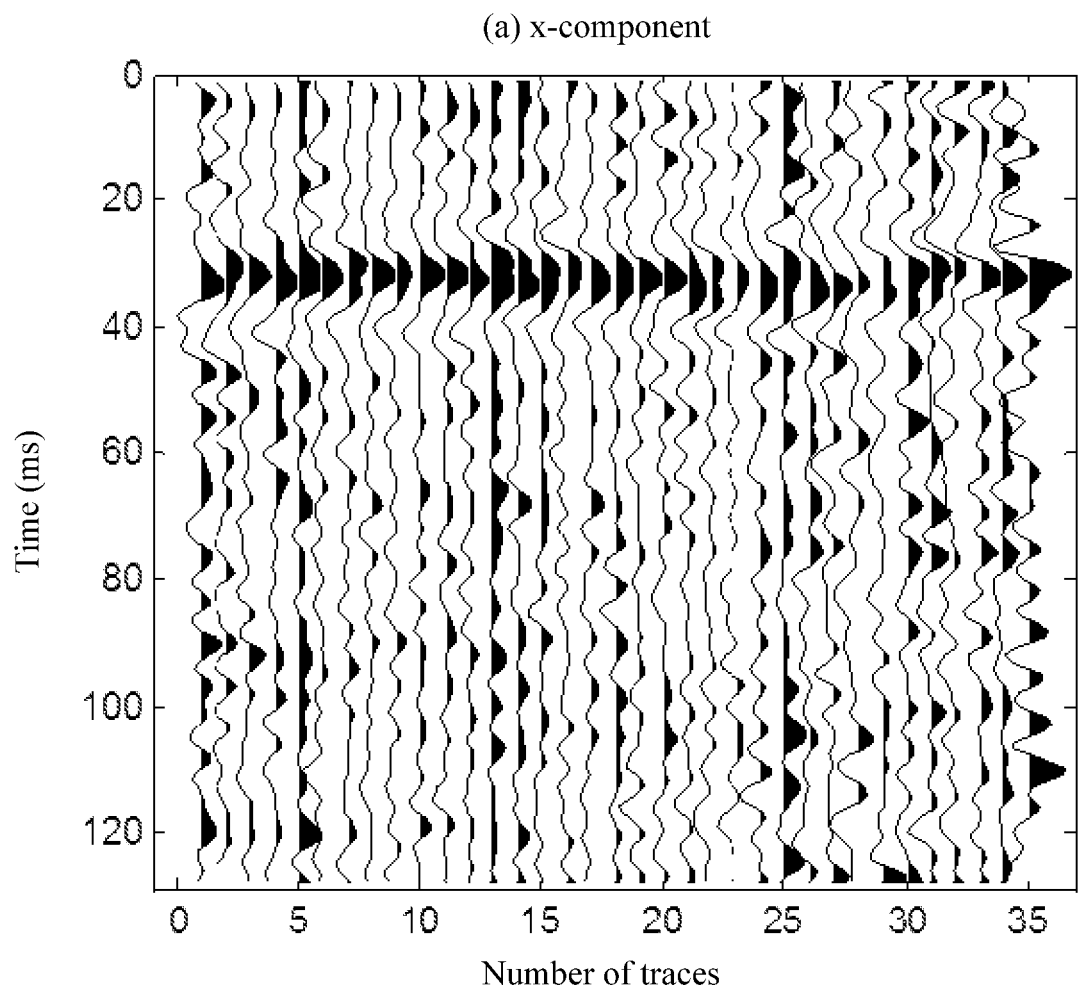
FIG. 6A, FIG. 6B and FIG. 6C are denoising effect diagrams obtained by using a vector denoising method for multicomponent seismic data according to an embodiment of the present application.
Figure 6B:
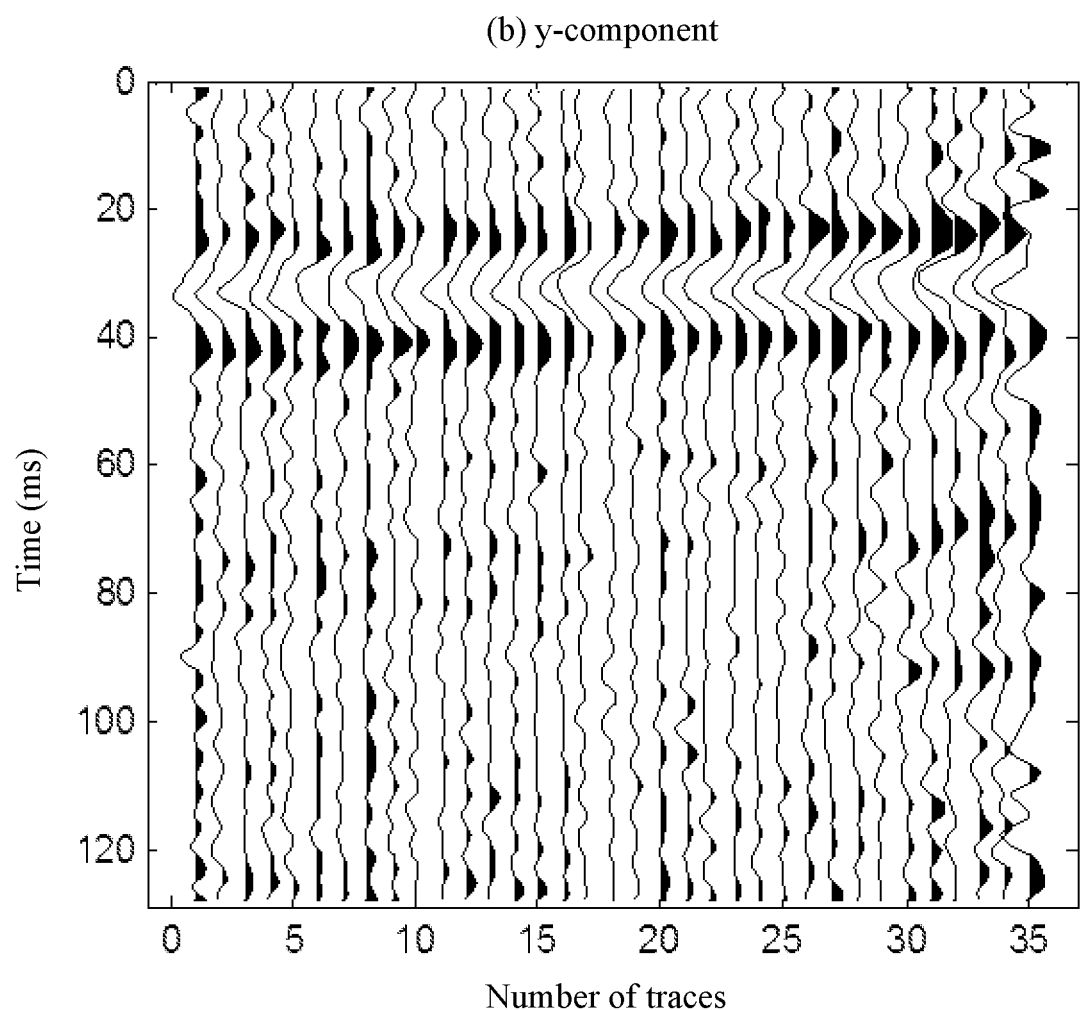
Figure 6C:
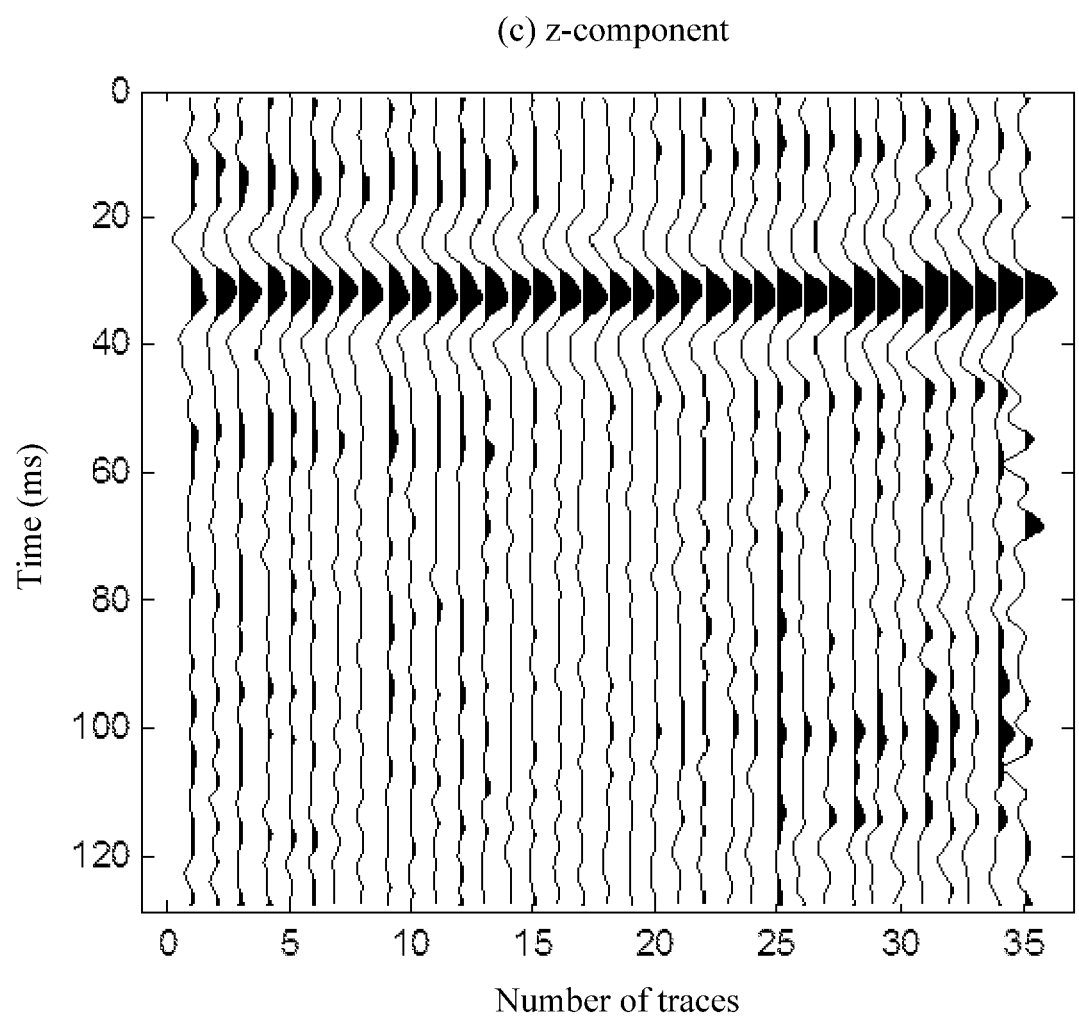
Figure 7A:
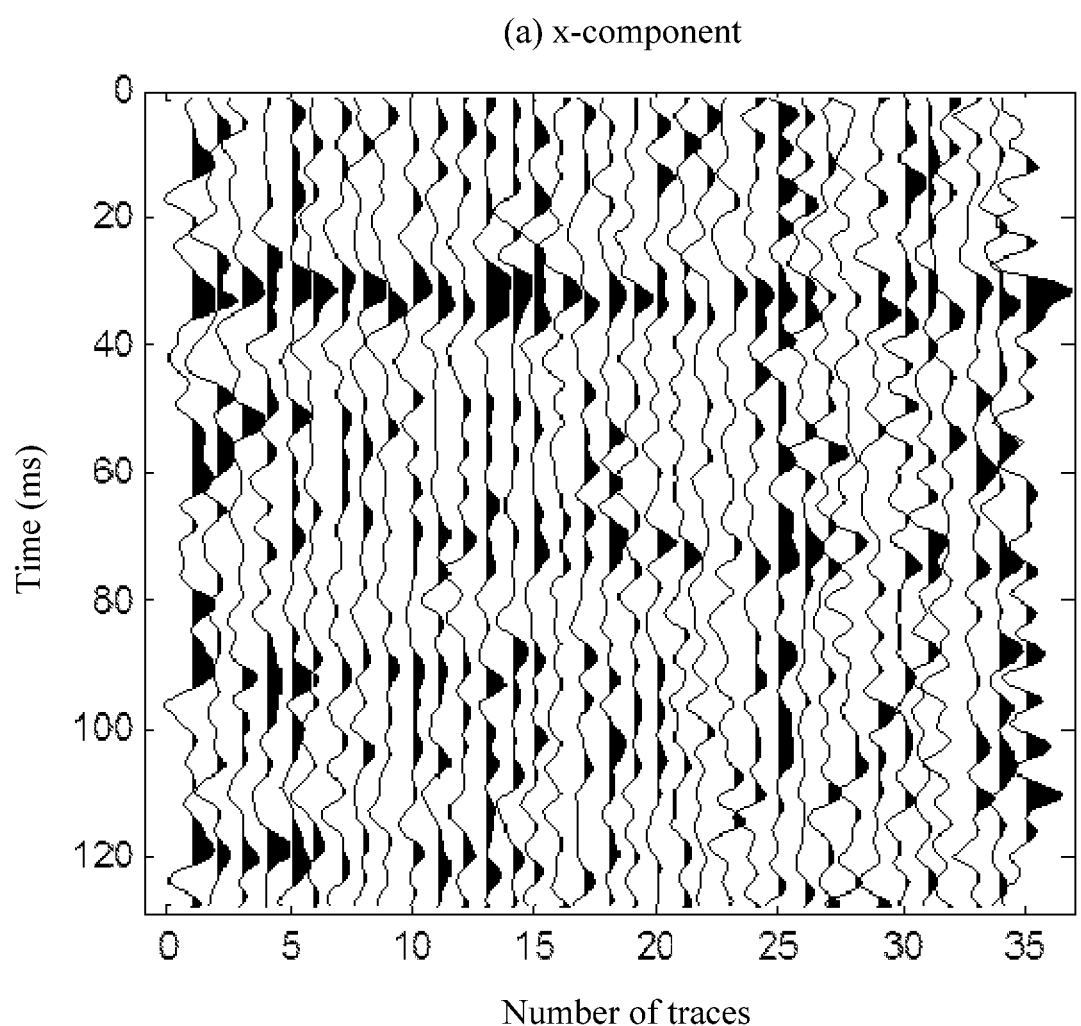
FIG. 7A, FIG. 7B and FIG. 7C are scalar field filtering effect diagrams obtained by using a conventional Cadzow filtering method.
Figure 7B:
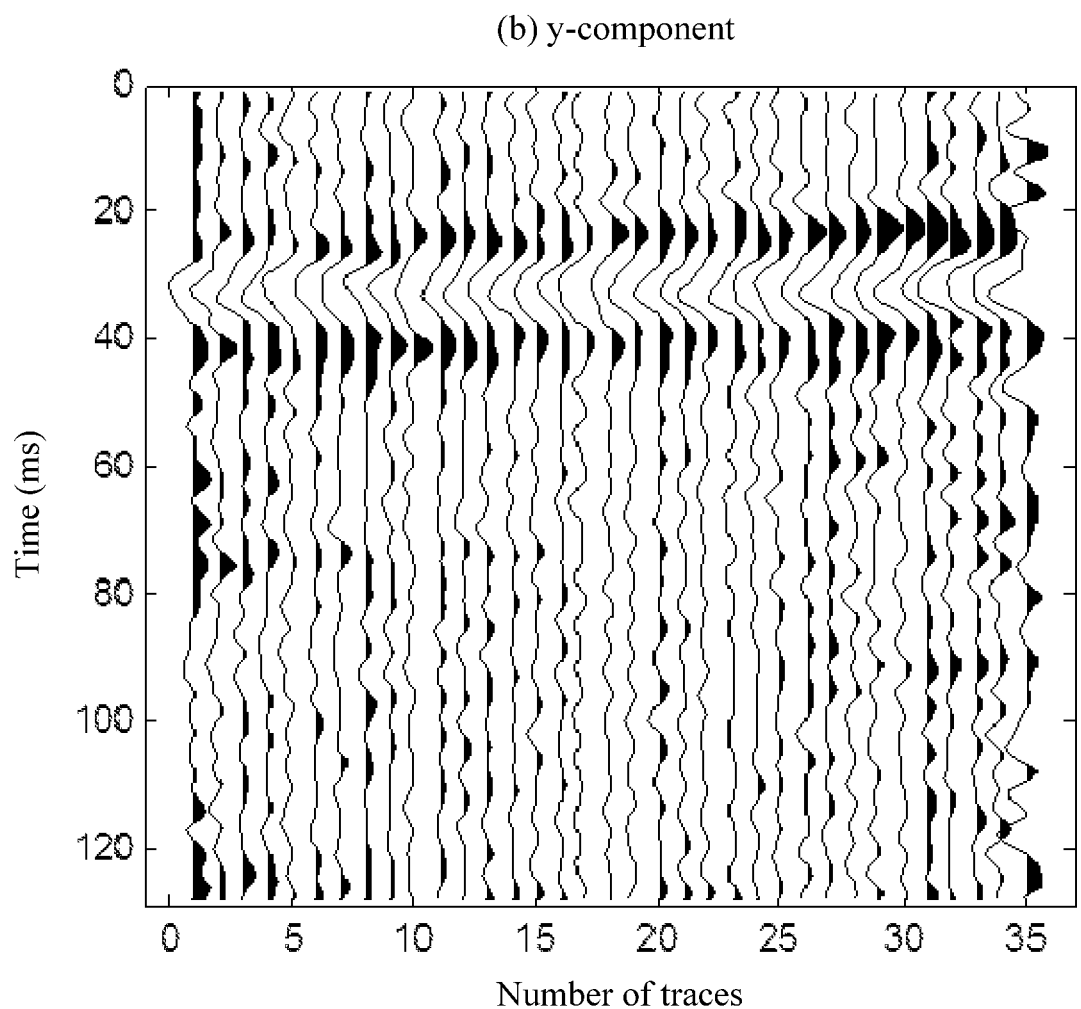
Figure 7C:
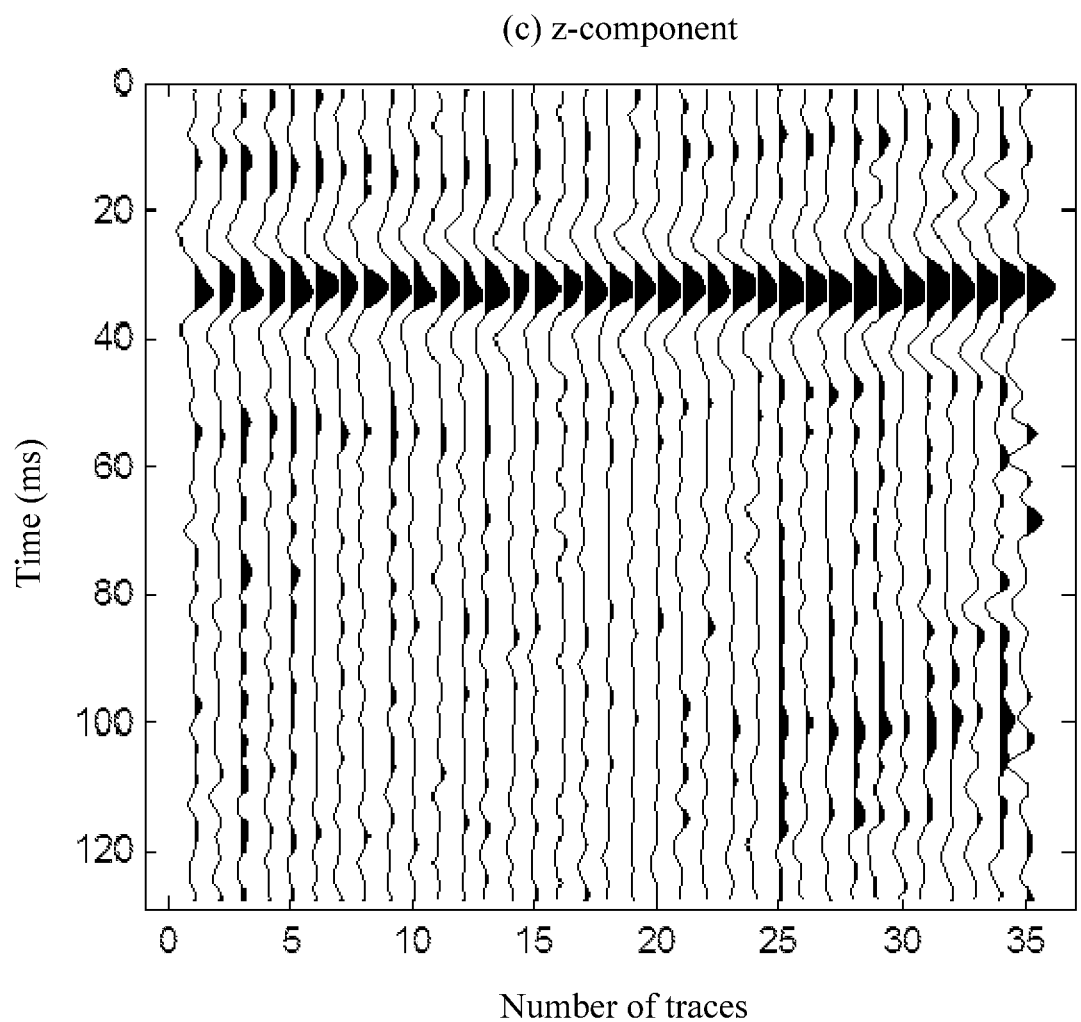

The effectiveness of the vector denoising method for multicomponent seismic data described in the present application is verified by combining with specific experiments. FIG. 5A, FIG. 5B and FIG. 5C are effect diagrams illustrating x-component, y-component and z-component of synthetic seismic data after adding random noise. FIG. 6A, FIG. 6B and FIG. 6C are denoising effect diagrams obtained by using a vector denoising method for multicomponent seismic data according to an embodiment of the present application. FIG. 7A, FIG. 7B and FIG. 7C are scalar field filtering effect diagrams obtained by using a conventional Cadzow filtering method. When the added random noise is large, filtering results of vector filtering by using the vector denoising method for multicomponent seismic data according to an embodiment of the present application are shown in FIG. 6A, FIG. 6B and FIG. 6C. As a comparison, filtering results of scalar field filtering for each component by using the conventional Cadzow filtering method are shown in FIG. 7A, FIG. 7B and FIG. 7C.

It may be seen from the above comparison results that the vector denoising method for multicomponent seismic data according to the embodiments of the present application can remove the random noise more effectively and retain effective seismic signals better than the conventional scalar denoising method. Especially for the x-component with a low signal-to-noise ratio, a vector denoising method can achieve better results, so that the vector features of the multicomponent seismic data may be better retained.

Figure 8:
FIG. 8 is a schematic structural diagram illustrating a vector denoising device for multicomponent seismic data according to an embodiment of the present application.

FIG. 8 is a schematic structural diagram illustrating a vector denoising device for multicomponent seismic data according to an embodiment of the present application, which may include one or more functional modules stored in the memory 802 with the form of software. As shown in FIG. 8, from the functional division, the vector denoising device for multicomponent seismic data may include: a calculating module 701, a filtering module 702 and a determining module 703.

The calculating module 701 is configured to decompose multicomponent seismic gather data to obtain a plurality of small multicomponent seismic data, and obtaining quaternary frequency domain seismic data by performing a quaternary Fourier transformation according to each of the plurality of small multicomponent seismic data.

The filtering module 702 is configured to extract frequency slices from the quaternary frequency domain seismic data in a quaternary frequency domain, and filter the frequency slices by using a Cadzow filtering method to obtain filtered quaternary frequency domain seismic data.

The determining module 703 is configured to perform an inverse quaternary Fourier transformation on the filtered quaternary frequency domain seismic data to obtain filtered seismic data of each component.

Optionally, further, the calculating module 701 is specifically configured to divide the multicomponent seismic gather data into the plurality of small multicomponent seismic data with a time length of T and a horizontal trace number of N, wherein there is data overlap between any two adjacent small multicomponent seismic data of the plurality of small multicomponent seismic data, the N is an integer greater than 0 and less than total trace number of seismic gather data, and the T is an integer greater than 0 and less than a total number of time sampling points of the seismic gather data.

Optionally, the calculating module 701 is configured to: perform a quaternion transformation on the small multicomponent seismic data to obtain transformed small multicomponent seismic data q(t, x), wherein q(t, x)=a(t, x)+b(t, x) i+c(t, x) j+d(t, x) k, the x is an ordinal number of seismic traces, the x is equal to 1, 2, . . . , N, the t is an ordinal number of time sampling points, the t is equal to 1, 2, . . . , T, the i, j and k are imaginary units of quaternion, the a(t, x) is pressure component seismic data, the b(t, x) is x-component seismic data, the c(t, x) is y-component seismic data, the d(t, x) is z-component seismic data, and when any one of the pressure component seismic data, the x-component seismic data, the y-component seismic data and the z-component seismic data is missing, missing component seismic data is replaced with zero; and perform the quaternary Fourier transformation on the transformed small multicomponent seismic data to obtain the quaternary frequency domain seismic data.

Optionally, the filtering module 702 is specifically configured to: extract the frequency slices of $Q_1, Q_2, \ldots Q_N$ from the quaternary frequency domain seismic data in the quaternary frequency domain, the $Q_{i=1, 2, \ldots N}$ represents a value of an i-th trace at a given frequency in the quaternary frequency domain, and construct a quaternion Hankel matrix by using the frequency slices, the quaternion Hankel matrix being:

$$A = \begin{bmatrix} Q_1 & Q_2 & \cdots & Q_{N-M+1} \\ Q_2 & Q_3 & \cdots & Q_{N-M+2} \\ \vdots & \vdots & \ddots & \vdots \\ Q_M & Q_{M+1} & \cdots & Q_N \end{bmatrix}$$

and the M being a positive integer less than N;

decompose the quaternion Hankel matrix by using a singular value decomposition method;

retain k largest singular values and set other singular values to zero, the quaternion Hankel matrix being reconstructed to obtain a reduced rank matrix $F_k(A)$; and average the reduced rank matrix $F_k(A)$ along an anti-diagonal line to obtain the filtered quaternary frequency domain seismic data.

Optionally, in the quaternion Hankel matrix, the M is an integer obtained by rounding up N/2.

Optionally, the determining module 703 is specifically configured to perform the inverse quaternary Fourier transformation on filtered quaternary frequency domain multicomponent seismic data obtained after filtering all frequency slices to obtain the filtered seismic data of each component.

Optionally, the determining module 703 is configured to perform the inverse quaternary Fourier transformation on the filtered quaternary frequency domain seismic data Q'(f, x) to obtain the filtered seismic data q'(t,x) of each component, wherein $q'(t,x)=\int_{-\infty}^{+\infty}e^{-2\pi\mu ft}Q'(f,x)df$.

The foregoing device may be configured to execute the method provided in the foregoing method embodiments, the specific implementation manners and technical effects are similar to the foregoing method embodiments, and details are not described herein again.

The above modules may be configured as one or more integrated circuits to implement the above methods, for example, one or more Application Specific Integrated Circuits (ASIC), or one or more Digital Signal Processors (DSP), or one or more Field Programmable Gate Arrays (FPGA), etc. For another example, when one of the above modules is implemented in the form of a processing element to schedule program codes, the processing element may be a general-purpose processor, such as a Central Processing Unit (CPU) or other processors that may call the program codes. For another example, these modules may be integrated together, which may be implemented in the form of System-On-a-Chip (SOC).

Optionally, the present application further provides a machine readable storage medium, such as a computer readable storage medium, including a program. When the program is executed by one or more processors, any one of the above method embodiments is implemented.

In several embodiments provided in the present application, it should be understood that the disclosed device and method may be implemented in other ways. For example, the device embodiments described above are only illustrative. For example, the division of an unit is only a logical function division, and there may be other divisions in actual implementation, for example, multiple units or components may be combined or integrated into another system, or some features may be ignored or not implemented. In addition, the shown or discussed mutual coupling or direct coupling or communication connection may be through some interfaces, and the indirect coupling or communication connection of the devices or units may be in electrical, mechanical or other forms.

The units described as separate parts may or may not be physically separated, and the components displayed as units may or may not be physical units, i.e., the parts and the components may be located in one place, or may be distributed on multiple network units. Some or all of the units may be selected according to actual needs to achieve the purposes of the solutions of the embodiments.

In addition, the functional units in the various embodiments of the present application may be integrated into one processing unit, or each unit may exist alone physically, or two or more units may be integrated into one unit. The above-mentioned integrated unit may be implemented in a form of hardware, or may be implemented in a form of hardware plus software functional units.

The above-mentioned integrated units implemented in the form of software functional units may be stored in a computer readable storage medium. The above-mentioned software functional units are stored in one storage medium, including several instructions to make a computer device (which may be a personal computer, a server, or a network device, etc.) or a processor execute some steps of the method described in each embodiment of the present application. The aforementioned storage medium includes various medium that may store the program codes, such as U disk, mobile hard disk, Read-Only Memory (ROM), Random Access Memory (RAM), magnetic disk or optical disk, etc.

In the vector denoising method and the vector denoising device for multicomponent seismic data provided in the embodiments, by combining a quaternary Fourier transformation and a Cadzow filtering method, multicomponent seismic data is filtered in a vector space, which can effectively suppress noise and better retain and restore vector features of an original multicomponent seismic signal. The vector denoising method for multicomponent seismic data according to the embodiments of the present application can remove the random noise more effectively and retain effective seismic signals better than the conventional scalar denoising method. Especially for the x-component with a low signal-to-noise ratio, a vector denoising method can achieve better results, so that the vector features of the multicomponent seismic data may be better retained.

What is claimed is:

1. A vector denoising method for multicomponent seismic data, applied to a data processing device comprising a processor, the method comprising:

dividing, by the processor, multicomponent seismic gather data to obtain a plurality of multicomponent seismic data, wherein the multicomponent seismic gather data is data of gather which is a collection of multiple seismic traces, and each seismic trace is a reception record of a geophone;

obtaining, by the processor, quaternary frequency domain seismic data by performing a quaternary Fourier transformation according to each of the plurality of multicomponent seismic data;

extracting, by the processor, frequency slices from the quaternary frequency domain seismic data in a quaternary frequency domain, and filtering the frequency slices by using a Cadzow filtering method to obtain filtered quaternary frequency domain seismic data;

performing, by the processor, an inverse quaternary Fourier transformation on the filtered quaternary frequency domain seismic data to obtain a filtered transformed multicomponent seismic data; and describing and outputting, by the processor, a feature of an underground medium according to the filtered transformed multicomponent seismic data, wherein the feature of the underground medium comprises at least one of: structure, lithology, fluid saturation, pore pressure, and fracture.

2. The vector denoising method for multicomponent seismic data according to claim 1, wherein dividing the multicomponent seismic gather data to obtain the plurality of multicomponent seismic data comprises:

dividing the multicomponent seismic gather data into the plurality of multicomponent seismic data with a time length T and a horizontal trace number N, wherein, there is data overlap between any two adjacent multicomponent seismic data of the plurality of multicomponent seismic data, N is an integer greater than 0 and less than a total trace number of seismic gather data, and T is an integer greater than 0 and less than a total number of time sampling points of the seismic gather data.

3. The vector denoising method for multicomponent seismic data according to claim 2, wherein obtaining the quaternary frequency domain seismic data by performing the quaternary Fourier transformation according to each of the plurality of multicomponent seismic data comprises:

performing a quaternion transformation on each of the plurality of multicomponent seismic data to obtain transformed multicomponent seismic data q(t, x), wherein q(t, x)=a(t, x)+b(t, x) i+c(t, x) j+d(t, x) k, wherein x is an ordinal number of seismic traces equal to 1, 2, . . . , N, t is an ordinal number of time sampling points equal to 1, 2, . . . , T, i, j and k are imaginary units of quaternion, a(t, x) is pressure component seismic data, b(t, x) is x-component seismic data, c(t, x) is y-component seismic data, d(t, x) is z-component seismic data, and when any one of the pressure component seismic data, the x-component seismic data, the y-component seismic data and the z-component seismic data is missing, missing component seismic data is replaced with zero; and performing the quaternary Fourier transformation on the transformed multicomponent seismic data to obtain the quaternary frequency domain seismic data.

4. The vector denoising method for multicomponent seismic data according to claim 3, wherein performing the quaternary Fourier transformation on the transformed multicomponent seismic data to obtain the quaternary frequency domain seismic data comprises: performing the quaternary Fourier transformation on the transformed multicomponent seismic data q(t, x), through a formula $Q(f,x)q'(t,x)=\int_{-\infty}^{+\infty} e^{-2\pi\mu ft} q'(t,x)dt$, to obtain the quaternary frequency domain seismic data $Q(f,x)$, wherein f represents a frequency, and μ represents a transformation axis.

5. The vector denoising method for multicomponent seismic data according to claim 1, wherein extracting the frequency slices from the quaternary frequency domain seismic data in the quaternary frequency domain, and filtering the frequency slices by using the Cadzow filtering method to obtain the filtered quaternary frequency domain seismic data comprises:

extracting the frequency slices $Q_1, Q_2, \ldots Q_N$ from the quaternary frequency domain seismic data in the quaternary frequency domain, $Q_{i=1, 2, \ldots N}$ representing a value of an i-th trace at a given frequency in the quaternary frequency domain, and constructing a quaternion Hankel matrix by using the frequency slices, the quaternion Hankel matrix being:

$$A = \begin{bmatrix} Q_1 & Q_2 & \cdots & Q_{N-M+1} \\ Q_2 & Q_3 & \cdots & Q_{N-M+2} \\ \vdots & \vdots & \ddots & \vdots \\ Q_M & Q_{M+1} & \cdots & Q_N \end{bmatrix}$$

and M being a positive integer less than N;

decomposing the quaternion Hankel matrix by using a singular value decomposition method;

retaining k largest singular values and setting other singular values to zero, the quaternion Hankel matrix being reconstructed to obtain a reduced rank matrix $F_k(A)$; and averaging the reduced rank matrix $F_k(A)$ along an anti-diagonal line to obtain the filtered quaternary frequency domain seismic data.

6. The vector denoising method for multicomponent seismic data according to claim 5, wherein in the quaternion Hankel matrix, M is obtained by rounding up N/2.

7. The vector denoising method for multicomponent seismic data according to claim 5, wherein performing the inverse quaternary Fourier transformation on the filtered quaternary frequency domain seismic data to obtain the filtered transformed multicomponent seismic data comprises:

performing the inverse quaternary Fourier transformation on the filtered quaternary frequency domain seismic data obtained after filtering all frequency slices to obtain the filtered transformed multicomponent seismic data.

8. The vector denoising method for multicomponent seismic data according to claim 7, wherein performing the inverse quaternary Fourier transformation on the filtered quaternary frequency domain seismic data comprises:

performing the inverse quaternary Fourier transformation on the filtered quaternary frequency domain seismic data $Q'(f,x)$ to obtain the filtered transformed multicomponent seismic data q' (t,x), wherein $q'(t,x)=\int_{-\infty}^{+\infty} e^{-2\pi\mu ft} Q'(f,x)df$, f represents a frequency, and μ represents a transformation axis.

9. A non-transitory machine readable storage medium on which a machine executable instruction is stored, wherein when the machine executable instruction is executed by one or more processors, the vector denoising method for multicomponent seismic data according to claim 1 is implemented.

10. A vector denoising device for multicomponent seismic data, comprising:

a processor; and a memory for storing instructions executable by the processor, wherein the processor is configured to divide multicomponent seismic gather data to obtain a plurality of multicomponent seismic data, and obtain quaternary frequency domain seismic data by performing a quaternary Fourier transformation according to each of the plurality of multicomponent seismic data, wherein the multicomponent seismic gather data is data of gather which is a collection of multiple seismic traces, and each seismic trace is a reception record of a geophone;

extract frequency slices from the quaternary frequency domain seismic data in a quaternary frequency domain, and filter the frequency slices by using a Cadzow filtering method to obtain filtered quaternary frequency domain seismic data;

perform an inverse quaternary Fourier transformation on the filtered quaternary frequency domain seismic data to obtain a filtered transformed multicomponent seismic data; and describe and output a feature of an underground medium according to the filtered transformed multicomponent seismic data, wherein the feature of the underground medium comprises at least one of: structure, lithology, fluid saturation, pore pressure, and fracture.

11. The vector denoising device for multicomponent seismic data according to claim 10, wherein the processor is specifically configured to divide the multicomponent seismic gather data into the plurality of multicomponent seismic data with a time length T and a horizontal trace number N, wherein there is data overlap between any two adjacent multicomponent seismic data of the plurality of multicomponent seismic data, N is an integer greater than 0 and less than a total trace number of seismic gather data, and T is an integer greater than 0 and less than a total number of time sampling points of the seismic gather data.

12. The vector denoising device for multicomponent seismic data according to claim 11, wherein the processor is configured to:
perform a quaternion transformation on each of the plurality of multicomponent seismic data to obtain transformed multicomponent seismic data q(t, x), wherein q(t, x)=a(t, x)+b(t, x) i+c(t, x) j+d(t, x) k, wherein x is an ordinal number of seismic traces equal to 1, 2, ..., N, t is an ordinal number of time sampling points equal to 1, 2, ..., T, i, j and k are imaginary units of quaternion, a(t, x) is pressure component seismic data, b(t, x) is x-component seismic data, c(t, x) is y-component seismic data, d(t, x) is z-component seismic data, and when any one of the pressure component seismic data, the x-component seismic data, the y-component seismic data and the z-component seismic data is missing, missing component seismic data is replaced with zero; and
perform the quaternary Fourier transformation on the transformed multicomponent seismic data to obtain the quaternary frequency domain seismic data.

13. The vector denoising device for multicomponent seismic data according to claim 10, wherein the processor is specifically configured to: extract the frequency slices $Q_1, Q_2, \ldots Q_N$ from the quaternary frequency domain seismic data in the quaternary frequency domain, $Q_{i=1, 2, \ldots, N}$ representing a value of an i-th trace at a given frequency in the quaternary frequency domain, and construct a quaternion Hankel matrix by using the frequency slices, the quaternion Hankel matrix being:

$$A = \begin{bmatrix} Q_1 & Q_2 & \cdots & Q_{N-M+1} \\ Q_2 & Q_3 & \cdots & Q_{N-M+2} \\ \vdots & \vdots & \ddots & \vdots \\ Q_M & Q_{M+1} & \cdots & Q_N \end{bmatrix}$$

and M being a positive integer less than N;
decompose the quaternion Hankel matrix by using a singular value decomposition method;
retain k largest singular values and set other singular values to zero, the quaternion Hankel matrix being reconstructed to obtain a reduced rank matrix $F_k(A)$; and
average the reduced rank matrix $F_k(A)$ along an anti-diagonal line to obtain the filtered quaternary frequency domain seismic data.

14. The vector denoising device for multicomponent seismic data according to claim 13, wherein in the quaternion Hankel matrix, M is obtained by rounding up N/2.

15. The vector denoising device for multicomponent seismic data according to claim 13, wherein the processor is specifically configured to perform the inverse quaternary Fourier transformation on the filtered quaternary frequency domain seismic data obtained after filtering all frequency slices to obtain the filtered transformed multicomponent seismic data.

16. The vector denoising device for multicomponent seismic data according to claim 15, wherein the processor is configured to perform the inverse quaternary Fourier transformation on the filtered quaternary frequency domain seismic data Q'(f,x) to obtain the filtered transformed multicomponent seismic data q'(t,x), wherein $q'(t,x) = \int_{-\infty}^{+\infty} e^{-2\pi\mu ft} Q'(f, x) df$, f represents a frequency, and $\mu$ represents a transformation axis.

* * * * *